(12) United States Patent
Lai et al.

(10) Patent No.: US 7,579,055 B2
(45) Date of Patent: Aug. 25, 2009

(54) SOLE CONSTRUCTION FOR AN ATHLETIC SHOE

(75) Inventors: Jung Chung Lai, Guangzhou (CN); Michael Martin Nagel, Guangzhou (CN); Gerald Kuhtz, Encinitas, CA (US); Marco Aurelio Grott, San Marcos, CA (US); Alan Toronjo, Carlsbad, CA (US)

(73) Assignee: Taylor Made Golf Co., Inc., Carlsbad, CA (US)

( * ) Notice: Subject to any disclaimer, the term of this patent is extended or adjusted under 35 U.S.C. 154(b) by 458 days.

(21) Appl. No.: 10/615,681

(22) Filed: Jul. 8, 2003

(65) Prior Publication Data

US 2005/0005474 A1  Jan. 13, 2005

(51) Int. Cl.
*B32B 27/08* (2006.01)
*A43B 1/10* (2006.01)

(52) U.S. Cl. .................... 428/35.7; 428/34.1; 428/35.8; 428/36.5; 428/36.6; 428/36.8; 36/84; 36/87; 36/134; 36/4; 36/32 R

(58) Field of Classification Search ............... 428/34.1, 428/35.2, 35.3, 35.4, 35.7, 35.8, 36.1, 36.5, 428/36.6, 36.8; 36/83, 84, 87, 113–116, 36/126–130, 132, 134, 136, 4, 28, 30 R, 32 R
See application file for complete search history.

(56) References Cited

U.S. PATENT DOCUMENTS

| | | | |
|---|---|---|---|
| 3,597,863 A | 8/1971 | Austin et al. .................... 36/59 |
| 3,925,529 A | 12/1975 | Bernier et al. ............... 264/244 |
| 4,243,576 A * | 1/1981 | Fischer et al. ................ 523/212 |
| 4,958,447 A | 9/1990 | DuPree ........................ 36/101 |
| 5,177,824 A | 1/1993 | Ou ......................... 12/146 BR |
| 5,657,556 A | 8/1997 | Bemis ......................... 36/30 R |
| 5,733,647 A | 3/1998 | Moore, III et al. ........ 428/304.4 |
| 5,743,027 A | 4/1998 | Barma .............................. 36/4 |
| 5,771,605 A * | 6/1998 | Safdie ......................... 36/25 R |
| 5,848,482 A | 12/1998 | Bathum ....................... 36/127 |
| 5,869,591 A * | 2/1999 | McKay et al. ............... 526/347 |
| 5,887,363 A | 3/1999 | Rhodes ........................ 36/127 |
| 5,932,336 A * | 8/1999 | Allen et al. ............... 428/315.5 |
| 5,938,878 A * | 8/1999 | Hurley et al. ................ 156/219 |
| 5,979,083 A | 11/1999 | Robinson et al. .............. 36/127 |
| 6,161,315 A | 12/2000 | Dalton ........................ 36/134 |
| 6,276,073 B1 | 8/2001 | Curley, Jr. .................... 36/59 C |
| 6,463,681 B1 | 10/2002 | Savoie ......................... 36/134 |
| 6,748,677 B2 * | 6/2004 | Briant et al. .................. 36/134 |

OTHER PUBLICATIONS

Collection of Documents from www.adidas.freehomepage.com/adiprene.html (Apr. 28, 2003), 4 pgs.
Collection of Documents from www.styrene.org/sircqna.html (Apr. 28, 2003), 5 pgs.
"Engage polyolefin elastomers, the critical ingredient for success," DuPont Dow Eastomers, 9 pages.
Nike Golf, Q-Lok & Scorpion Spikes from www.nikegolf.com, 2 pages.

* cited by examiner

*Primary Examiner*—Rena L Dye
*Assistant Examiner*—Walter B Aughenbaugh
(74) *Attorney, Agent, or Firm*—Sheppard, Mullin, Richter & Hampton LLP

(57) ABSTRACT

An article of footwear including an upper and a sole, which has an outsole for directly contacting a ground surface, and at least one element compression molded with the outsole. The at least one element is formed from a first material including at least 45% ethylene vinyl acetate, approximately 30% polyene elastomer, and approximately 20% synthetic rubber. A second material of the outsole is compatible for compression molding with the at least one element, and is less hard and less dense than the at least one element.

16 Claims, 5 Drawing Sheets

SOLE CONSTRUCTION FOR AN ATHLETIC SHOE

FIELD OF THE INVENTION

The present invention relates generally to shoes, and more particularly to improved outsoles for athletic shoes, such as golf shoes.

BACKGROUND OF THE INVENTION

Golf shoes traditionally have included a shoe upper and a shoe sole, which is conventionally composed of a midsole and an outsole, which are connected together. Traditionally, the outsole, which is for directly contacting a ground surface, has been constructed of leather, however, the outsole also can be formed from any abrasion-resistant materials, such as natural or synthetic rubber, and, in particular, of thermoplastic polyurethane ("TPU"), which has a high degree of torsional rigidity. Thus, an outsole made from TPU can provide a stable and secure base for a shoe.

In general, the midsole can include a single layer or multiple layers of light-weight, resilient, cushioning material having substantial elasticity and toughness that is less hard than the outsole. For example, the midsole can be made from compression molded Ethyl Vinyl Acetate ("EVA") or blown urethane foam. These materials can help to dissipate shocks caused by walking and running, and also can alleviate discomfort caused by spike or cleat pressure points.

The outsole of a golf shoe generally includes a number of cleat receptacles into which removable golf cleats are inserted and secured. A traditional method for mounting the receptacles to the outsole includes inserting a pin, or other object, through the receptacle, effectively nailing the receptacle to the midsole of the shoe. Next, outsole material is formed around each receptacle.

A shoe sole constructed of the traditional materials exhibits several drawbacks. First, the addition of an outsole constructed from leather or TPU adds a large amount of weight to the shoe sole. Also, the manufacturing process for such an outsole is costly and time consuming. In addition, traditional methods for mounting receptacles to the sole of a golf shoe are costly. In view of the above, it is apparent that a need exists for an improved sole construction for a golf shoe that is lighter in weight and that is less costly and less time consuming to manufacture than those currently known. The present invention fulfills this need and provides further related advantages.

SUMMARY OF THE INVENTION

Embodiments of the present invention include a golf shoe having an improved sole with an enhanced anchoring system for cleats that is lighter in weight, and less costly and less time consuming to manufacture than currently known. The cleat receptacles included in the anchoring system are embedded within a solid, rubber-based form of EVA, or rubberized EVA, which is chemically compatible with the same material having blowing agents, for example, azodicarbonamide or asobisformamide, or normal EVA, that forms the outsole of the shoe.

A method of attaching the cleat receptacles to the sole of the shoe includes pre-molding one or more receptacles with rubberized EVA to form an anchor element. The normal EVA then undergoes conventional compression molding with one or more of the anchor elements to create the final version of the desired sole. In addition, the rubberized EVA may be used to form support or reinforcement portions along with the normal EVA, colorants, and foil, which also may be used with the rubberized EVA for cosmetic enhancement of the sole. The resulting sole is lighter in weight and performs comparable to conventional soles formed using hermoplastic urethane or rubber to anchor the cleats.

More particularly, the invention can reside in embodiments having one or more of the following features:
an article of footwear including an upper and a sole, which has an outsole for directly contacting a ground surface, and at least one element compression molded with the outsole, where the at least one element is formed from a first material including at least 45% ethylene vinyl acetate, approximately 30% polyene elastomer, and approximately 20% synthetic rubber, where a second material of the outsole is compatible for compression molding with the at least one element, and is less hard and less dense than the at least one element;
the polyene elastomer is ENGAGE;
the second material of the outsole includes ethylene vinyl acetate with blowing agents;
the second material of the outsole is selected from a group consisting of rubber, thermoplastic urethane, and ethylene vinyl acetate with blowing agents;
the outsole includes two materials selected from the group consisting of rubber, thermoplastic urethane, and ethylene vinyl acetate with blowing agents;
the at least one element is outwardly visible on the sole;
the at least one element includes a plurality of elements and at least one of the plurality of elements is outwardly visible on the sole;
the at least one element includes a foil layer that is outwardly visible on the sole;
the at least one element includes an electroplated member that is outwardly visible on the sole; and
the at least one element provides torsional reinforcement for the sole.

Also, the invention can reside in embodiments having one or more of the following features:
an article of footwear including an upper and a sole, where the sole includes an outsole for directly contacting a ground surface, at least one element compression molded with the outsole, and at least one cleat receptacle compression molded with the at least one element, where a material of the outsole is compatible for compression molding with the at least one element, the material of the outsole is less hard and less dense than the at least one element, the at least one element includes solid ethylene vinyl acetate, and the at least one cleat receptacle is accessible for attachment to a non-metal cleat;
the material of the outsole is selected from a group consisting of rubber, thermoplastic urethane, and ethylene vinyl acetate with blowing agents;
the outsole includes two materials selected from a group consisting of rubber, thermoplastic urethane, and ethylene vinyl acetate with blowing agents;
the at least one element includes a plurality of elements and each element of the plurality of elements includes a cleat receptacle;
the at least one element includes a plurality of elements and at least one element of the plurality of elements includes at least one cleat receptacle;
the at least one element includes a foil layer that is visible on the sole; and
the at least one element includes an electroplated member that is visible on the sole.

Furthermore, the invention can reside in embodiments having one or more of the following features:

a method for attaching an element to an outsole of a shoe, including providing a block outsole in a preliminary form where the block outsole includes a first material, providing a sheet of solid ethylene vinyl acetate, forming the sheet into a desired shape and size to provide a first element, and compression molding the first element with the block outsole, where the first material of the block outsole and the solid ethylene vinyl acetate of the first element are compatible for compression molding;

the steps of providing a sheet of solid ethylene vinyl acetate and forming the sheet of solid ethylene vinyl acetate include combining approximately 48% EVA 462, approximately 30% polyene elastomer, and approximately 20% synthetic rubber into a machine for kneading, kneading the mixture for a predetermined amount of time, and rolling the kneaded mixture until a substantially even thickness is obtained for the sheet;

the polyene elastomer is ENGAGE;

the first material is selected from a group consisting of ethylene vinyl acetate with blowing agents, rubber, and thermoplastic urethane, and the block outsole is provided in a preliminary form by grinding a larger block of the first material;

providing a second material selected from the group consisting of ethylene vinyl acetate with blowing agents, rubber, and thermoplastic urethane, where the second material is different from the first material in elasticity, color, and/or abrasion resistance, and the second material is compression molded with the block outsole to form a substantially final shoe sole;

providing at least one cleat receptacle, and compression molding the at least one cleat receptacle with the first element before compression molding of the first element with the block outsole;

providing a layer of foil with the first element before compression molding of the first element with the block outsole; and providing at least a second element, and compression molding the second element with the block outsole, where at least one of the first and second elements is visible on the shoe sole.

For purposes of summarizing the invention and the advantages achieved over the prior art, certain advantages of the invention have been described herein above. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein. All of these embodiments are intended to be within the scope of the invention herein disclosed. These and other embodiments of the present invention will become readily apparent to those skilled in the art from the following claims, detailed description, and drawings of the preferred embodiments, the invention not being limited to any particular preferred embodiment(s) disclosed.

DETAILED DESCRIPTION OF THE PREFERRED EMBODIMENTS

Figure 1:
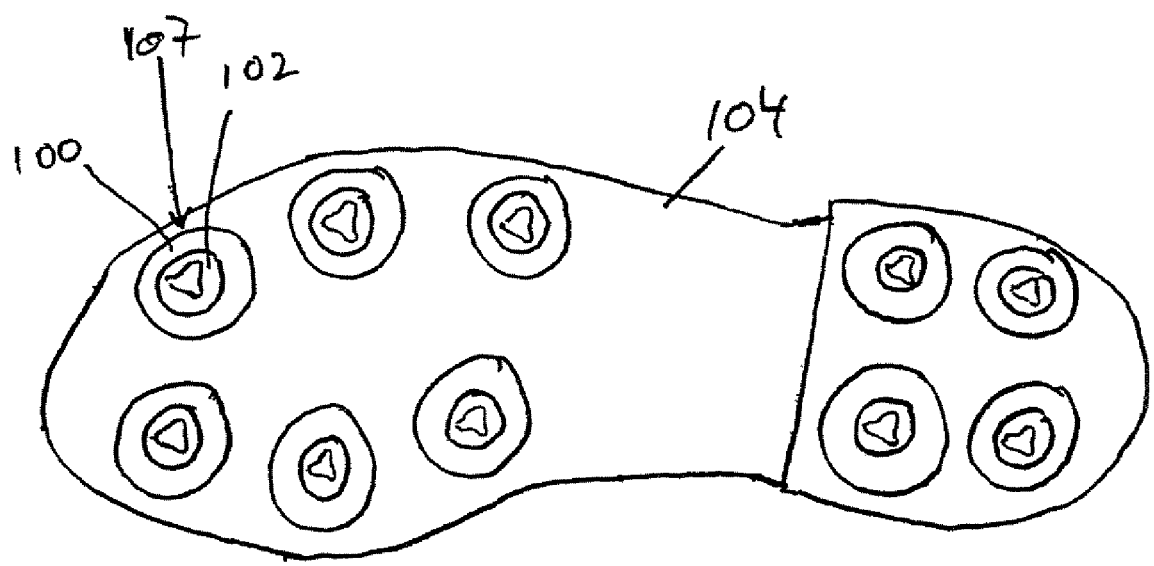
FIG. 1 is a bottom plan view of an outsole including cleat receptacles and ESS material according to a preferred embodiment.

The present invention resides in an improved sole construction for a golf shoe incorporating a polymer material known as EVA-Solid-Sponge ("ESS") material, which is based upon ethylene vinyl acetate ("EVA"). Specifically, the ESS material includes: 1) at least approximately 45%, and more preferably at least approximately 48% of EVA; 2) approximately 30% polyene elastomer; and 3) approximately 20% synthetic rubber. The ESS material provides a number of advantages, including: ease of molding; ease of bonding to other materials, as well as high fluidity, when used in compression molding processes; high resistance to abrasion; and, light weight, with a density of 0.94 g/cm$^3$. Currently, the ESS material is marketed by Huan Sheng Plastic Co., Ltd. located in Luo Gang Village, Xin Shi Town, Bai Yun District, GuagZhou, China.

A preferred polyene elastomer for use in the ESS material is marketed by E.I. duPont de Nemours & Co. under the trademark ENGAGE. The ENGAGE polyene elastomer is a kind of ethene that has excellent fluidity and that can crosslink effectively through oxidation and irradiation methods so as to get excellent properties of thermo-aging, compression set, and resistance to climate. ENGAGE can also improve other polyene properties such as shock resistance. ENGAGE has high load capacity for filler and can be used to manufacture electrically insulating products.

The ESS material can be manufactured by performing the following steps. First, EVA462, ENGAGE, synthetic rubber, and complement materials, for example, dicumyl peroxide (DCP), stearic acid (ST), and oil, are placed into a kneader, which mixes the materials together for approximately 10 minutes at approximately 105° C. to approximately 110° C. The resulting ESS material is taken out the kneader and roughly rolled using a mechanical roller into a single piece having a thickness of approximately 0.22 inch to approximately 0.38 inch. Next, the ESS material is evenly rolled four times using the mechanical roller resulting in a layer approximately 0.03 inch to approximately 0.04 inch thick. Finally, the ESS material is cut into sheets. Colored ESS material can be formed using the above process with the added step of adding pigment along with the other materials into the kneader.

The ESS material exhibits the following physical characteristics: a Shore A hardness of up to about 90 (comparable to conventional TPUs used in golf shoes), an elasticity of 41%, an abrasion test plate of 14 mm$^3$, a tear strength of 33 N/mm, a tensile strength of 22 N/mm$^2$, a breaking elongation of 564 N/mm$^2$, cementation to rubber of 88 N/cm, cementation to rubber aging of 180 N/cm, and light fastness of 5. Additionally, the ESS material is not damaged during a bending test performed at +23 C W. Prick, or at −10° C. Prick, and its properties do not change significantly when subjected to an aging test. The present invention uses these unique physical properties and integrates the ESS material into golf footwear constructions.

The ESS material can be directly molded to open cell materials, such as LS3EVA, normal EVA, hi-abrasion EVA, VGB, BIM, and Adiprene. VGB includes approximately 37% EVA 462, approximately 37% ENGAGE, approximately 12% synthetic rubber, and approximately 14% other complements, for example, dicumyl peroxide (DCP), stearic acid (ST), azodicarbonamide (ADP) (blowing agent), zinc oxide (ZnO), zinc stearic acid (ZnST), and titanium dioxide ($TiO_2$). BIM and Adiprene include approximately 48% synthetic rubber, approximately 9% EVA 460, approximately 17% R-260 (which serves as a resin/support agent), approximately 22% silica (which serves as a filler), and approximately 4% of other complements, for example, titanium dioxide ($TiO_2$), dicumyl peroxide (DCP), stearic acid (ST), and Zinc Oxide (ZnO).

Referring to FIG. 1, in preferred embodiments of the present invention, the ESS material 100 is incorporated into at least one element, for example, a cleat receptacle 102, attached to a shoe outsole 104 made from a material that is softer and lighter, i.e., less hard and less dense, than the element. This outsole material is chosen so that the outsole can be compression molded. Examples of outsole materials include EVA incorporating blowing agents, rubber, TPU incorporating blowing agents, and mixtures of these. The element preferably is configured so that a portion of it is exposed and outwardly visible on the outsole. Also, the element can be configured to provide torsional reinforcement to the outsole.

The ESS material 100 can be used to replace TPU or rubber support members that interface with the cleat receptacles 102, and, thus create a lighter and more cost effective outsole 104. The weight saving brought about by using the ESS material instead of TPU or rubber can exceed from approximately 10 grams to approximately 32 grams while providing excellent performance for the cleated golf shoe (not shown). Furthermore, the present invention can eliminate the need for support members (not shown) all together by utilizing an anchoring mechanism that directly molds the cleat receptacles into moldable EVA, rubber, or TPU-based outsoles.

Figure 2:
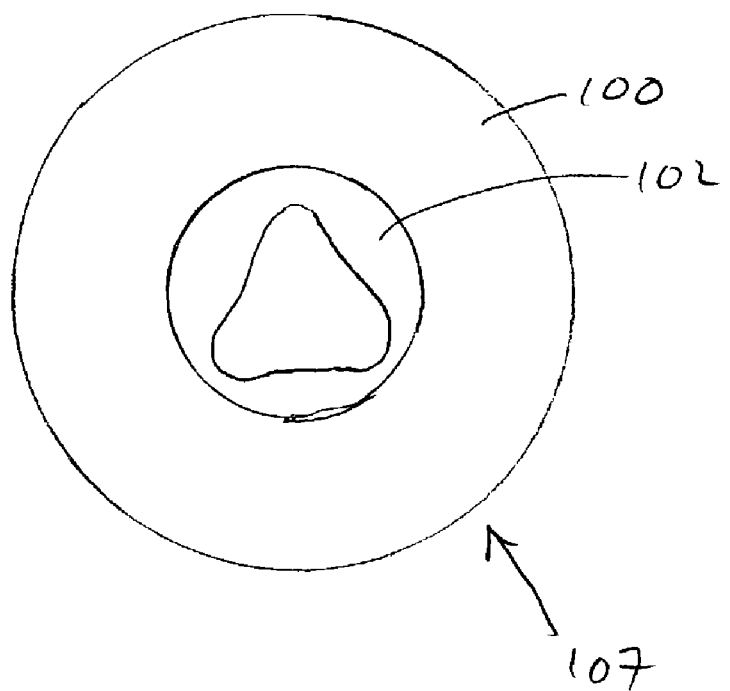
FIG. 2 is a top plan view of a cleat receptacle and ESS material according to a preferred embodiment.
Figure 3:
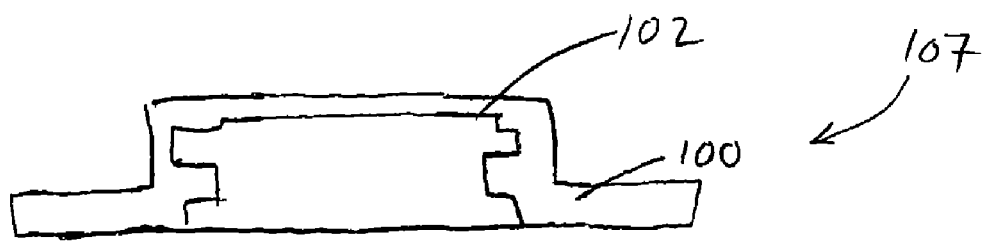
FIG. 3 is a sectional view of the cleat receptacle and ESS material depicted in FIG. 2.

During an example compression molding process, a piece of ESS material 100 is cut and placed on both sides of a cleat receptacle 102. The ESS material can be cut as desired to receive one or more cleat receptacles. The pieces of ESS material and the receptacles are compression molded, resulting in an ESS material-encased receptacle 107, as illustrated in FIGS. 2 and 3. In one embodiment, two pieces of ESS material are cut using cutting dies (not shown), a receptacle is placed on the two pieces of ESS material, two more cut pieces of ESS material are placed over the receptacle, two cover layers (not shown) made of the ESS material, are placed over the pieces of ESS material, and the combination is compression molded. In an example compression molding process, the ESS material and receptacles are heated for 6 minutes at 145° C. to 160° C., and then cooled for 10 minutes at 25° C. to 28° C., with a machine pressure of 50 kg/$cm^2$ to 70 kg/$cm^2$, and an air pressure of 7 to 7.5 kg/$cm^2$.

Figure 4:
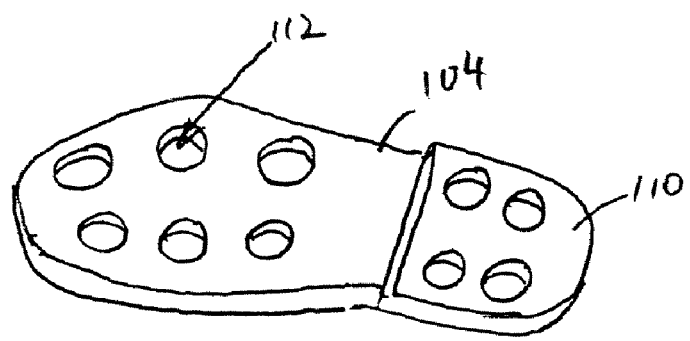
FIG. 4 is a bottom perspective view of a blocker according to a preferred embodiment.

Referring additionally to FIG. 4, an outsole 104 can be formed from EVA material that is ground into the desired form for the outsole. The ground outsole is called a block outsole or a "blocker" 110. Each ESS material-encased receptacle 107 is inserted into a recess 112 formed in the blocker, and the blocker and ESS material-encased receptacles are then compression molded together. The finished outsole can be significantly lighter in weight than a TPU or rubber sole. In another embodiment, the receptacle, which can be secured to the EVA blocker using cement (not shown), and the ESS material 100 are compression molded under the following conditions: heating for 9 minutes at 140°C. to 160°C., and cooled for 16 minutes at 25° C. to 28° C., with a machine pressure of 50 kg/$cm^2$ to 70 kg/$cm^2$, and air pressure of 7 kg/$cm^2$ to 7.5 kg/$cm^2$.

Figure 5:
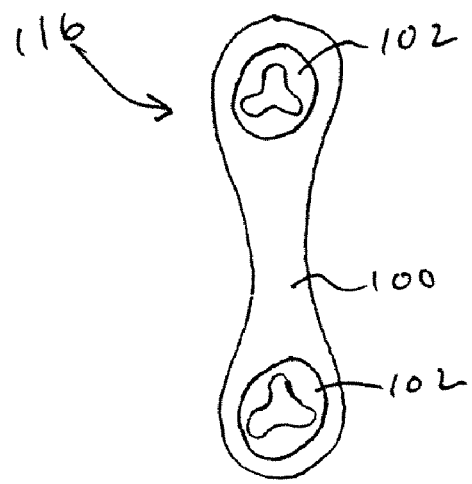
FIG. 5 is a top plan view of a bridge connector including two cleat receptacles according to preferred embodiment.
Figure 6:
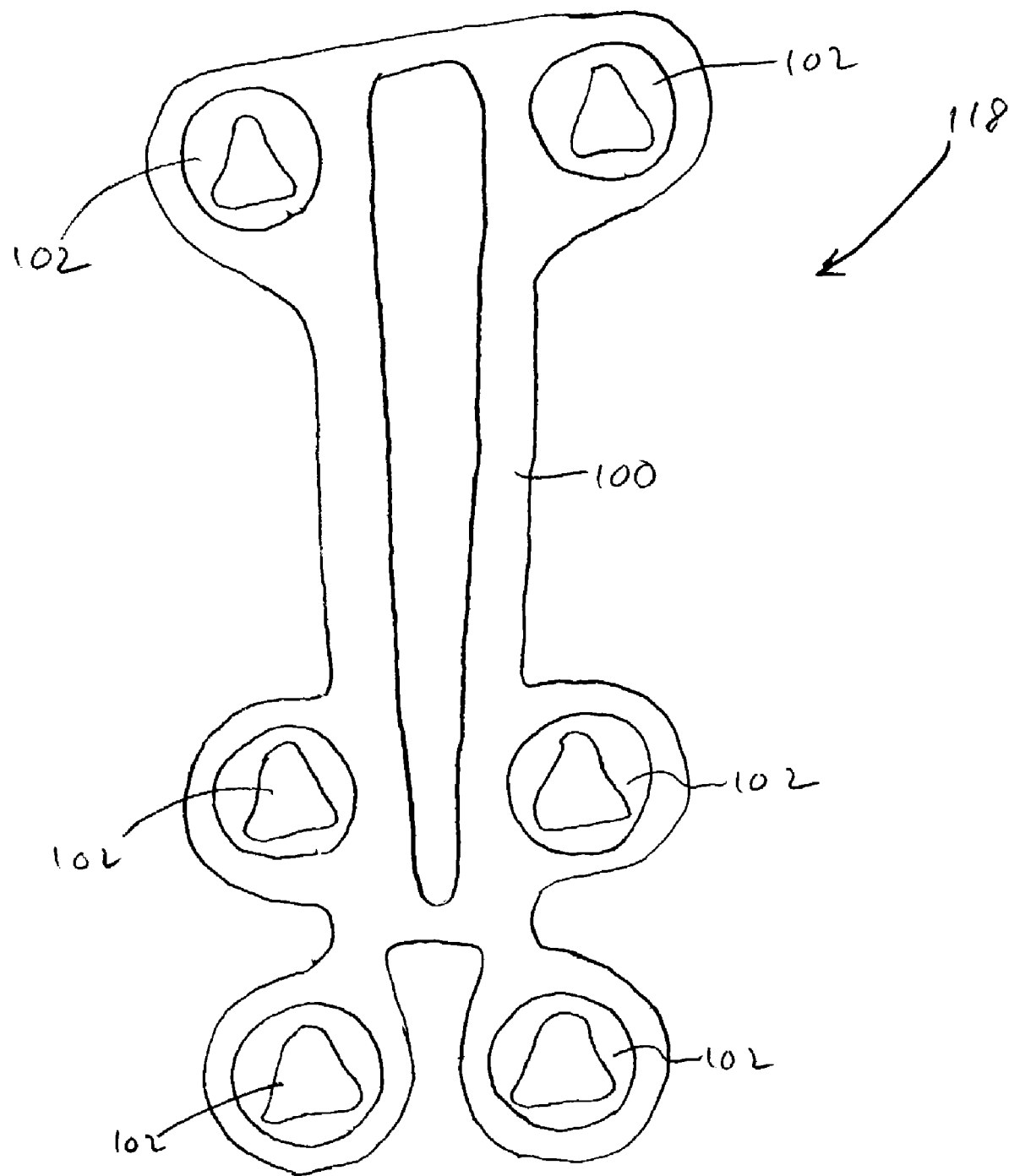
FIG. 6 is a top plan view of torsion bar including six cleat receptacles according to a preferred embodiment.

Referring additionally to FIGS. 5 and 6, the ESS material 100 can form bridge connectors 116 between more than one receptacle 102, as well as separate shank or reinforcement members, e.g., torsion bars 118, that are compression molded to the blocker 110 and included in the outsole 104. When used as a support, the ESS material can be used to reinforce and provide added stability, e.g., torsional reinforcement, for specific areas such as the forefoot, heel, and shank. In the embodiment shown in FIG. 6, six receptacles are shown encased in ESS material forming a torsion bar. During molding of the ESS material in combination with the six receptacles, the heating time was 6 minutes, heating temperature was 145° C. to 160° C., the cooling time was 10 minutes, cooling temperature was 25° C. to 28° C., machine pressure was 50 kg/$cm^2$ to 70 kg/$cm^2$, and air pressure was 7 kg/$cm^2$ to 7.5 kg/$cm^2$.

Figure 7:
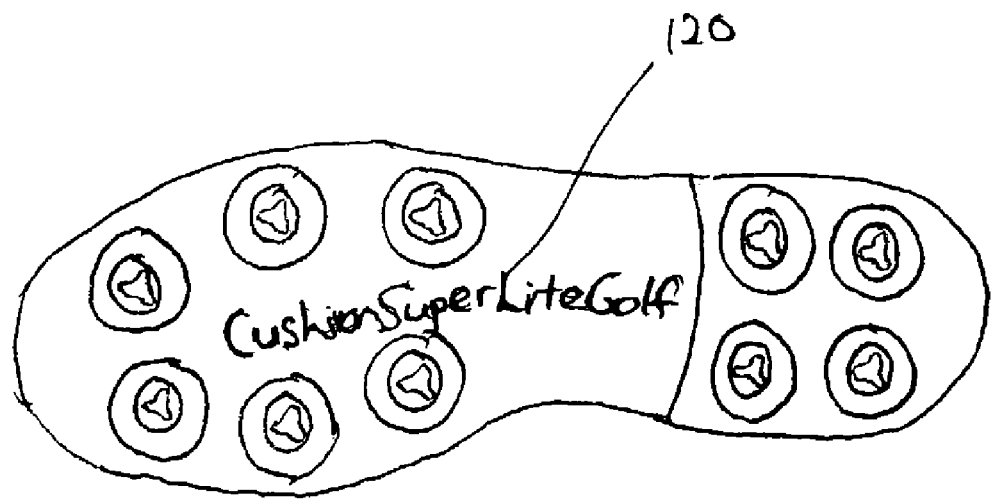
FIG. 7 is a bottom plan view of shoe logo incorporated into an outsole according to a preferred embodiment.

In addition, ESS material can be used as a connection bridge for compression molding different materials onto EVA. For example, as illustrated in FIG. 7, electroplated or flow-molded members, for example, a shoe logo 120, can be combined with an underlayer made from ESS material, and can be directly compression molded onto an EVA blocker. During processing, the ESS material, electroplated members, and EVA blocker are then molded together. Afterwards, the combination of the ESS material, electroplated members, and EVA blocker are demolded and finished. The resulting electroplated member is outwardly visible on the resulting outsole 104.

As discussed previously, the use of ESS material 100 instead of TPU or rubber components can result in overall weight reduction for the outsole 104. For example, an outsole formed using TPU parts (not shown) compression molded with EVA blocker 110 resulted in a sole weighing 129 grams. When ESS material was used in place of TPU, the resulting compression molded sole weighed only 119 grams. Thus, the use of ESS material instead of TPU resulted in an overall sole weight reduction of 10 grams. In an additional example, cleat receptacles 102 were encased with ESS material and the resulting ESS-encased receptacles 107 were compression molded with an EVA blocker, the resulting sole weighed only 96.5 grams. Therefore, the use of ESS material resulted in an overall weight reduction of 32.5 grams.

In addition to weight reduction, the use of the ESS material 100 can result in reduced molding costs. The cost savings may reach from approximately 50% to approximately 70% depending upon the sole design and construction. In one example, TPU parts (not shown) were compression molded with an EVA blocker 110 to form a conventional outsole 104. This process required a TPU injection molding process step, which costs approximately $3,500 per set, and an EVA molding step, which costs approximately $2,350 per set. In contrast, when ESS material was used in place of TPU, only a single EVA molding step was required, since the ESS material could be compression molded directly with EVA. Thus, cost savings was realized by eliminating the TPU injection molding process step. Utilizing ESS material instead of TPU or rubber also can shorten the mold lead time and process duration. In addition, a high-strength bond can be formed by directly compression molding the ESS material with the EVA blocker. The ESS mold supplier is Hsieh Yi Mold Mfg. Co., Ltd. located in Hsiaoping Village, Shih Ching Town Kwang Chow. Also, ESS compression molding is supplied by Yucheng Industrial Ltd. located in XiaoPing Village, Shijing Country GZ, China.

Figure 8:
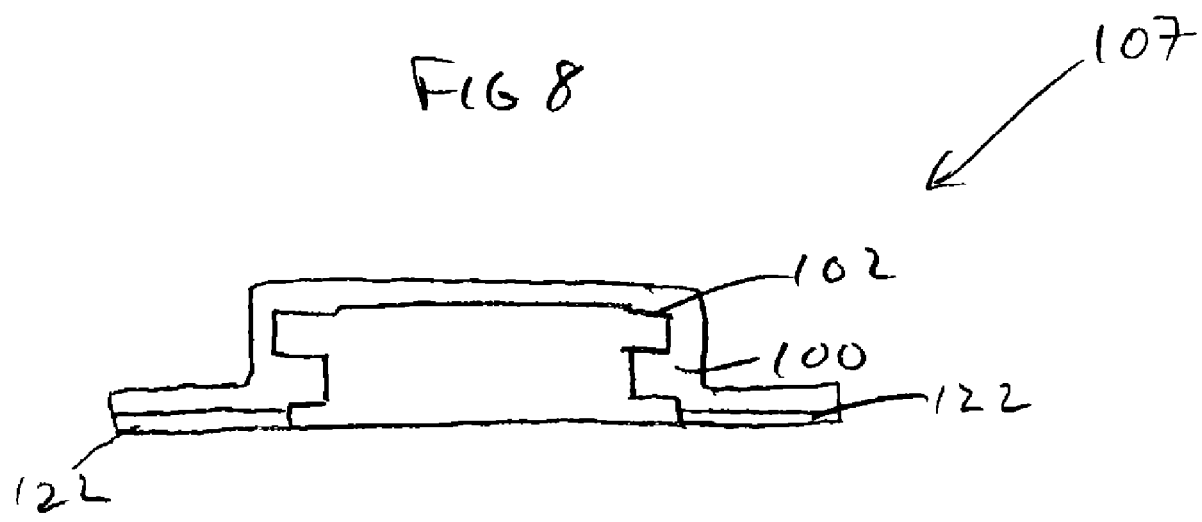
FIG. 8 is a sectional view of a cleat receptacle, ESS material, and foil according to a preferred embodiment.

In other embodiments, as illustrated in FIG. 8, radiant foil material 122 or colorants, which are outwardly visible on the outsole 104 (not shown), are included in the ESS material-encased cleat receptacle 107 to provide enhanced cosmetic appeal of the final outsole construction. The ESS material 100 is sandwiched between the receptacle 102 and an outer layer of foil. During the manufacturing process for one embodiment, one layer of foil is positioned on one side of the receptacle with one layer of ESS material positioned between the layer of foil and the receptacle, two layers of ESS material are positioned on the opposite side of the receptacle, followed by two cover layers (not shown) made of the ESS material, and the combination is molded. The foil may be formed from two layers of 95 Shore A clear TPU film, for example, CM590/500 from 3M located in St. Paul, Minn. which is dyed to the specific color, nipped to the desired shape, and high frequency molded. The foil can be cleaned and cemented to the receptacle before molding. The radiant foil supplier is Giant Knitting located in Hsial Chiang Chen Village, Kao Pu Town, Tung Kuan City. The cleaning and cement suppliers respectively are Maxbond Co., Ltd. located at No. 633, sec 1 sha tyan Rd., Ta Tu Hsiang, TaiChung Shine, Taiwan, and Fubang Ahesive Co., Ltd. located at X1 Con Industrial District, Sha Wan, Panyu, GZ China.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. An article of footwear, comprising:
    an upper and a sole, wherein the sole has an outsole for directly contacting a ground surface; and
    at least one element compression molded with the outsole, wherein the at least one element is formed from a first material comprising at least 45% ethylene vinyl acetate, approximately 30% polyene elastomer, and approximately 20% synthetic rubber, and wherein the at least one element is not damaged during a bending test performed at 23° C. W. Prick or at −10° C. Prick; and
    wherein the outsole includes a second material that is compatible for compression molding with the at least one element and is less hard and less dense than the at least one element.

2. The article of footwear according to claim 1, wherein the second material of the outsole includes ethylene vinyl acetate with blowing agents.

3. The article of footwear according to claim 1, wherein the second material of the outsole is selected from a group consisting of rubber, thermoplastic urethane, and ethylene vinyl acetate with blowing agents.

4. The article of footwear according to claim 1, wherein the outsole comprises two materials selected from a group consisting of rubber, thermoplastic urethane, and ethylene vinyl acetate with blowing agents.

5. The article of footwear according to claim 1, wherein the at least one element is outwardly visible on the sole.

6. The article of footwear according to claim 1, wherein the at least one element comprises a plurality of elements and at least one of the plurality of elements is outwardly visible on the sole.

7. The article of footwear according to claim 1, wherein the at least one element includes a foil layer that is outwardly visible on the sole.

8. The article of footwear according to claim 1, wherein the at least one element includes an electroplated member that is outwardly visible on the sole.

9. The article of footwear according to claim 1, wherein the at least one element provides torsional reinforcement for the sole.

10. An article of footwear, comprising:
    an upper and a sole, wherein the sole has an outsole for directly contacting a ground surface;
    at least one element compression molded with the outsole, wherein the at least one element is formed from a first material comprising at least 45% ethylene vinyl acetate, approximately 30% polyene elastomer, and approximately 20% synthetic rubber, and wherein the at least one element is not damaged during a bending test performed at 23° C. W. Prick or at −10° C. Prick; and
    at least one cleat receptacle compression molded with the at least one element;
    wherein the outsole includes a second material that is compatible for compression molding with at least one element and that is less hard and less dense than the at least one element, and wherein the at least one cleat receptacle is accessible for attachment of a non-metal cleat.

11. The article of footwear according to claim 10, wherein the material of the outsole is selected from a group consisting of rubber, thermoplastic urethane, and ethylene vinyl acetate with blowing agents.

12. The article of footwear according to claim 10, wherein the outsole comprises two materials selected from a group consisting of rubber, thermoplastic urethane, and ethylene vinyl acetate with blowing agents.

13. The article of footwear according to claim 10, wherein the at least one element comprises a plurality of elements and each element of the plurality of elements includes a cleat receptacle.

14. The article of footwear according to claim 10, wherein the at least one element comprises a plurality of elements and at least one element of the plurality of elements includes at least one cleat receptacle.

15. The article of footwear according to claim 10, wherein the at least one element includes a foil layer that is visible on the sole.

16. The article of footwear according to claim 10, wherein the at least one element includes an electroplated member that is visible on the sole.

* * * * *